US011626805B2

(12) United States Patent
Winkler et al.

(10) Patent No.: US 11,626,805 B2
(45) Date of Patent: Apr. 11, 2023

(54) CONTROL LOOP FOR FLYBACK POWER CONVERTER

(71) Applicant: Infineon Technologies AG, Neubiberg (DE)

(72) Inventors: Markus Winkler, Munich (DE); Tommaso Bacigalupo, Fuerstenfeldbruck (DE); Davide Giacomini, Valdenge (IT)

(73) Assignee: Infineon Technologies AG, Neubiberg (DE)

( * ) Notice: Subject to any disclaimer, the term of this patent is extended or adjusted under 35 U.S.C. 154(b) by 213 days.

(21) Appl. No.: 17/130,330

(22) Filed: Dec. 22, 2020

(65) Prior Publication Data
US 2022/0200461 A1    Jun. 23, 2022

(51) Int. Cl.
*H02M 3/335*    (2006.01)
*H02M 1/00*    (2006.01)

(52) U.S. Cl.
CPC ..... *H02M 3/33523* (2013.01); *H02M 1/0032* (2021.05); *H02M 1/0041* (2021.05)

(58) Field of Classification Search
CPC .......... H02M 3/33523; H02M 1/0032; H02M 1/0041
See application file for complete search history.

(56) References Cited

U.S. PATENT DOCUMENTS

| | | | | |
|---|---|---|---|---|
| 5,126,930 A | * | 6/1992 | Ahn ................... | H02M 3/33561 315/411 |
| 5,920,466 A | * | 7/1999 | Hirahara ........... | H02M 3/33523 363/21.02 |
| 5,952,849 A | | 9/1999 | Haigh | |
| 5,999,421 A | * | 12/1999 | Liu ................... | H02M 3/33523 363/21.15 |
| 6,333,862 B1 | * | 12/2001 | Lee ................... | H02M 3/33507 363/21.01 |
| 6,873,065 B2 | | 3/2005 | Haigh et al. | |

(Continued)

OTHER PUBLICATIONS

Analog Devices, "High Voltage, Isolated IGBT Gate Driver with Isolated Flyback Controller," ADuM4138, Rev. A, Dec. 2018, 24 pp.

(Continued)

*Primary Examiner* — Kyle J Moody
(74) *Attorney, Agent, or Firm* — Shumaker & Sieffert, P.A.

(57) ABSTRACT

An example controller for a flyback power converter includes a secondary-side circuit comprising a secondary-side controller. The secondary-side controller is configured to sense an electrical characteristic of a secondary-side output of the flyback power converter, select, based on the sensed electrical characteristic, a power mode, and transmit, over a communication channel, a control message specifying the selected power mode. A primary-side circuit of the controller includes a primary-side controller. The primary-side controller is configured to receive, over the communication channel, the control message specifying the selected power mode and control primary-side flyback drive circuitry of the primary-side circuit to drive a primary-side output of the flyback power converter according to the selected power mode so as to control a value of the electrical characteristic of the secondary-side output of the flyback power converter.

20 Claims, 8 Drawing Sheets

(56) References Cited

U.S. PATENT DOCUMENTS

| | | | |
|---|---|---|---|
| 7,054,169 B2* | 5/2006 | Huh | H02M 3/33523 |
| | | | 363/21.16 |
| 7,075,329 B2 | 7/2006 | Chen et al. | |
| 2009/0153116 A1* | 6/2009 | Hachiya | H02M 3/33523 |
| | | | 323/282 |
| 2016/0005376 A1* | 1/2016 | Joo | H02M 3/33523 |
| | | | 345/212 |
| 2020/0366210 A1* | 11/2020 | Murofushi | G03G 15/80 |

OTHER PUBLICATIONS

AVAGO Technologies, "Automotive 2.5 Amp Gate Drive Optocoupler with Integrated Flyback Controller for Isolated DC-DC Converter, Integrated IGBT Desat Overcurrent Sensing, Miller Current Clamping and UVLO Feedback," ACPL-32JT, Jan. 20, 2014, 19 pp.

ROHM Semiconductor, "Optocoupler-less Isolated Flyback Converter," BD7F100HFN-LB BD7F100EFJ-LB, Rev 003, Apr. 17, 2017, 31 pp.

ROHM Semiconductor, "1ch Gate Driver Providing Galvanic Isolation, 2500Vrms Isolation Voltage," BM60056FV-C, Rev. 001, Jun. 20, 2018, 48 pp.

Texas Instrument, "LM5180-Q1 65-VIN PSR Flyback DC/DC Converter with 100-V, 1.5-A Integrated MOSFET," LM5180-Q1, Revised Apr. 2019, 42 pp.

* cited by examiner

CONTROL LOOP FOR FLYBACK POWER CONVERTER

TECHNICAL FIELD

This disclosure relates to power converters, and more specifically, flyback power converters that include a primary side and a secondary side.

BACKGROUND

In flyback power converters it may be desirable to communicate signals from the secondary side to the primary side. Some types of communication may include synchronizing primary and secondary switch timing and communicating changes in load power demand. Some example techniques to communicate between the secondary and primary may include a separate communication channel, which may require isolation. For example, an optoisolator may be a component of a separate communication channel between a secondary side and a primary side of a power converter, with galvanic isolation. Other examples may require additional components in order to modulate existing signals that are already occurring in the power converter, such as by modulating a ringing frequency.

SUMMARY

In general, the disclosure describes control techniques for a flyback power converter that uses a control loop with an efficient communication scheme between a primary-side controller and a secondary-side controller. The secondary-side controller senses an electrical characteristic, such as a voltage or a current, of a secondary-side output of the flyback power converter. The secondary-side controller selects, based on the sensed electrical characteristic, a power mode of a plurality of power modes. In some examples, the plurality of power modes include a low power mode, a high power mode, and a cycle skip power mode. The secondary-side controller transmits, over a galvanically-isolated communication channel, a control message specifying the selected power mode to the primary-side controller. The primary-side controller receives the control message specifying the selected power mode and controls primary-side flyback drive circuitry to drive a primary-side output of the flyback power converter according to the selected power mode so as to control a value of the electrical characteristic of the secondary-side output of the flyback power converter.

The techniques of the disclosure may provide specific improvements to the field of flyback power converters that have practical applications. For example, the use of a controller for a flyback power converter as described herein may allow a secondary-side controller to transmit control messages to a primary-side controller at a frequency that is substantially less often than the clock frequency of the primary-side controller and using only 2 bits per control message, thereby reducing the resources required to implement a feedback loop for a flyback power converter. Therefore, by both reducing the frequency of transmission of feedback information and reducing the size of each transmission of feedback information, a flyback power converter as described herein may use a single communication channel to implement both the feedback loop between the primary-side controller and the secondary-side controller as well as for exchanging other types of data, such as diagnostic information. Thus, a flyback power converter as described herein may eliminate the need for an additional communication channel dedicated solely to the feedback loop, thereby allowing such a flyback power converter to be cheaper to manufacture and be implemented with a smaller silicon footprint than other flyback power converters.

In one example, this disclosure describes a controller for a flyback power converter comprising a secondary-side circuit comprising a secondary-side controller configured to: sense an electrical characteristic of a secondary-side output of the flyback power converter; select, based on the sensed electrical characteristic, a power mode of a plurality of power modes; and transmit, over a communication channel, a control message specifying the selected power mode; and a primary-side circuit isolated from the secondary-side circuit, the primary-side circuit comprising a primary-side controller configured to: receive, over the communication channel, the control message specifying the selected power mode; and control primary-side flyback drive circuitry of the primary-side circuit to drive a primary-side output of the flyback power converter according to the selected power mode to control a value of the electrical characteristic of the secondary-side output of the flyback power converter.

In another example, this disclosure describes a method comprising sensing, by a secondary-side controller of a secondary-side circuit of a controller for a flyback power converter, an electrical characteristic of a secondary-side output of the flyback power converter; selecting, by the secondary-side controller and based on the sensed electrical characteristic, a power mode of a plurality of power modes; transmitting, by the secondary-side controller and over a communication channel, a control message specifying the selected power mode; receiving, by a primary-side controller of a primary-side circuit of the controller and over the communication channel, the control message specifying the selected power mode, wherein the primary-side circuit is isolated from the secondary-side circuit; and controlling, by the primary-side controller, primary-side flyback drive circuitry of the primary-side circuit to drive a primary-side output of the flyback power converter according to the selected power mode to control a value of the electrical characteristic of the secondary-side output of the flyback power converter.

In another example, this disclosure describes a system comprising a gate driver configured to drive a primary-side output of the flyback power converter; and a controller for a flyback power converter comprising a secondary-side circuit comprising a secondary-side controller configured to: sense an electrical characteristic of a secondary-side output of the flyback power converter; select, based on the sensed electrical characteristic, a power mode of a plurality of power modes; and transmit, over a communication channel, a control message specifying the selected power mode; and a primary-side circuit isolated from the secondary-side circuit, the primary-side circuit includes a primary-side controller configured to: receive, over the communication channel, the control message specifying the selected power mode; and control the gate driver to drive a primary-side output of the flyback power converter according to the selected power mode to control a value of the electrical characteristic of the secondary-side output of the flyback power converter.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
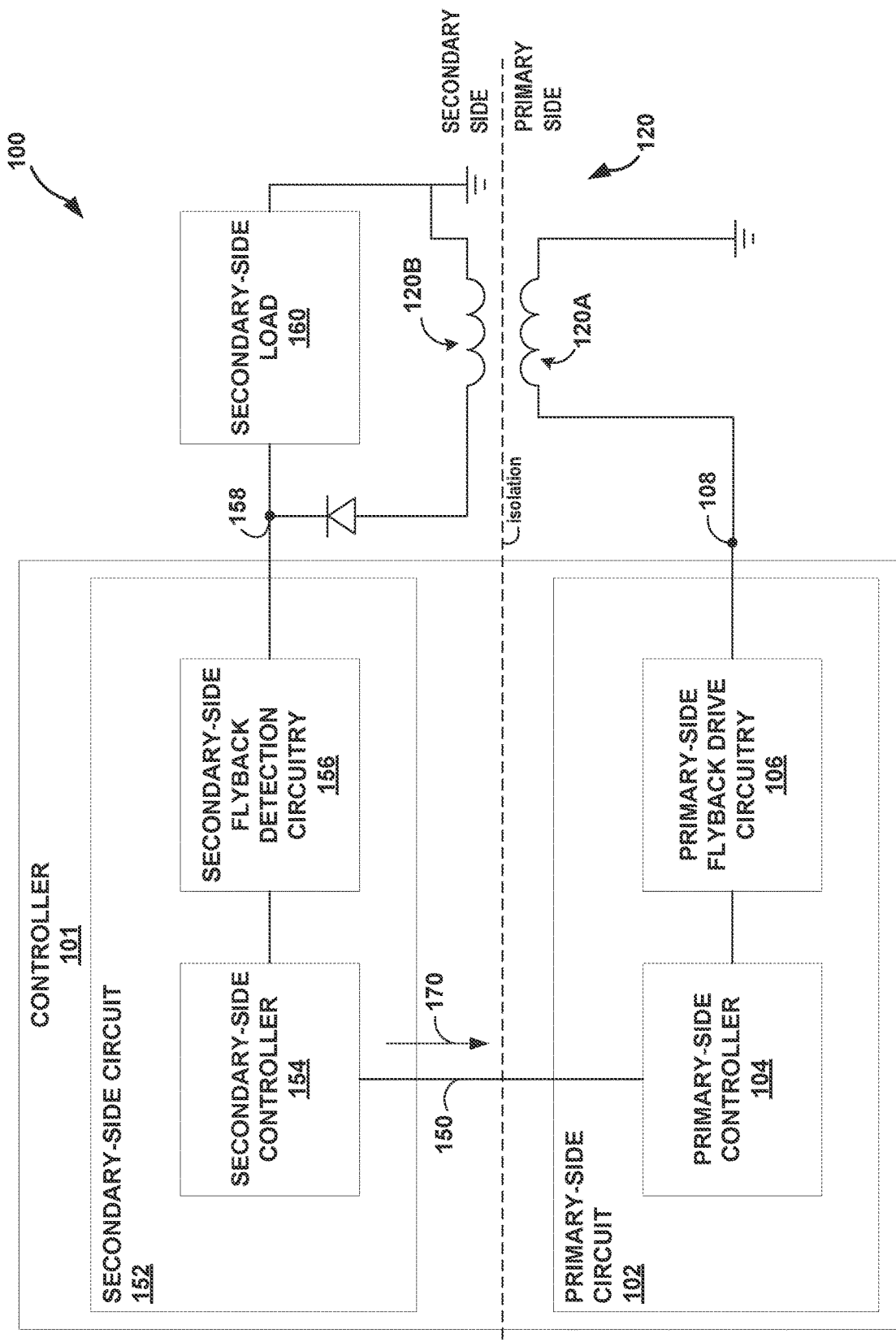
FIG. 1 is a block diagram illustrating an example system including a controller for a flyback power converter in accordance with the techniques of the disclosure.

This disclosure describes control techniques for a flyback power converter that use a control loop with an efficient communication scheme between a primary-side controller and a secondary-side controller. In accordance with the techniques of the disclosure, a secondary-side controller for a secondary-side circuit may use one or more comparators to monitor a regulated electrical characteristic on a secondary-side output. The secondary-side controller uses the sensed electrical characteristic to generate a derived set of digital control information (e.g., a power mode request). The secondary-side controller sends this control information as a control message through an existing feedback channel to the primary-side circuit. A primary-side controller for the primary-side circuit uses this control message to control primary-side flyback drive circuitry to drive a primary-side electrical output and/or adjust a primary-side output power according to the power mode specified by the control message.

Thus, a flyback power converter system as described herein splits the control loop of the flyback power converter between the primary-side circuit and the secondary-side circuit. For example, the secondary-side controller performs voltage recognition, digital demand formulation, and filtering, while the primary-side controller controls the primary-side drive circuitry to generate a drive signal based on a compressed digital request from the secondary-side controller. For example, the primary side controller injects fixed energy pulses (according to a high power mode or a low power mode) on a primary flyback coil, the power mode specified during each clock cycle according to the control message received from the secondary-side controller over the isolation barrier.

A flyback power converter system as described herein may effectively transmit data from the secondary-side circuit to the primary-side circuit. In some examples, for a 3-point controller, only 2 bits are needed to indicate a power mode according to which the primary-side controller is to control the primary-side drive circuitry. For example, the primary-side drive circuitry may operate according to a low power mode, a high power mode, or a cycle skip mode. This enables a flyback power converter system to use a very low data transfer rate while still obtaining a very precise output (e.g., within 2% of a target output voltage).

Thus, the techniques of the disclosure enable a flyback power transformer to use a data transfer rate between the secondary-side circuit and the primary-side circuit that is less than one-fourth of the Nyquist frequency and by transferring, e.g., only 2 bits specifying the power mode instead of 8 bits or more for, e.g., a pure voltage feedback over the isolation barrier, while achieving a high level of output voltage precision. Therefore, a flyback power transformer as described herein may benefit from a substantial reduction in traffic over the communication channel between the secondary-side circuit and the primary-side circuit. Furthermore, the very small amount of transmitted data may be linked to main load changes instead of continuously transmitting a measurement of the secondary-side output, and may be easily implemented on existing communication channels.

FIG. 1 is a block diagram illustrating example system 100 including controller 101 for a flyback power converter in accordance with the techniques of the disclosure. Flyback power converter system 100 is a buck-boost converter with 2 coupled inductances (e.g., a transformer) which transfer energy from first winding 120A to second winding 120B. Flyback power converter system 100 further provides the additional advantage of isolation between components connected to first winding 120A (referred to herein as the "primary side") and components connected to second winding 120B (referred to herein as the "secondary side"). In some examples, flyback power converter system 100 is a DC-DC flyback converter topology for isolated gate drivers, such as an insulated-gate bipolar transistor (IGBT).

Flyback power converter system 100 includes controller 101, transformer 120, and secondary-side load 160. Controller 101 controls the operation of flyback power converter system 100 and comprises primary-side circuit 102 and secondary-side circuit 152. Primary-side circuit 102 and secondary-side circuit 152 are galvanically-isolated from one another. First winding 120A of transformer 120 is connected to primary-side output 108 of primary-side circuit 102 of controller 101. Second winding 120B of transformer 120 is connected to secondary-side output 158 and secondary-side load 160. Secondary-side load 160 is typically a high-voltage application.

Secondary-side circuit 152 of controller 101 comprises secondary-side controller 154 and secondary-side flyback detection circuitry 156. Secondary-side controller 154 senses, via secondary-side flyback detection circuitry 156, an electrical characteristic of secondary-side output 158. Secondary-side controller 154 sends feedback information based on the sensed electrical characteristic of secondary-side output 158 over galvanically-isolated communication channel 150.

Primary-side circuit 102 comprises primary-side controller 104 and primary-side flyback drive circuitry 106. Primary-side controller 104 receives, over communication channel 150, the feedback information from secondary-side controller 154. Primary-side controller 104 controls, based on the feedback information, primary-side flyback drive circuitry 106 to drive primary-side output 108, which in turn drives a value of the electrical characteristic of secondary-side output 158.

In some examples, a first semiconductor die comprises primary-side circuit 102 and a second semiconductor die different than the first semiconductor die comprises secondary-side circuit 152. Communication channel 150 comprises a high-voltage isolation channel between the first semiconductor die and the second semiconductor die. Controller 101 may be incorporated into a single package that comprises the first semiconductor die, the second semiconductor die, and the high-voltage isolation channel.

In accordance with the techniques of the disclosure, flyback power converter system 100 implements an efficient communication scheme between primary-side controller 104 and secondary-side controller 154. As described herein, secondary-side controller 152 senses, via secondary-side detection circuitry 156, an electrical characteristic, such as a voltage or a current, of secondary-side output 158 of flyback power converter system 100. Secondary-side controller 154 selects, based on the sensed electrical characteristic, a power mode of a plurality of power modes. In some examples, the plurality of power modes include a low power mode, a high power mode, and a cycle skip power mode. Secondary-side controller 154 transmits, over communication channel 150 to primary-side controller 104, control message 170 specifying the selected power mode. Primary-side controller 104 receives control message 170 specifying the selected power mode and controls primary-side flyback drive circuitry 106 to drive primary-side output 108 of flyback power converter system 100 according to the selected power mode so as to control a value of the electrical characteristic of secondary-side output 158 of flyback power converter system 100.

The techniques of the disclosure may provide specific improvements to the field of flyback power converters that have practical applications. For example, the use of a controller for a flyback power converter as described herein may allow one to transmit control messages to primary-side controller at a frequency that is substantially less often than the clock frequency of the primary-side controller and using only 2 bits per control message, thereby reducing the resources required to implement a feedback loop for a flyback power converter. Therefore, a flyback power converter as described herein may use a single communication channel to implement both the feedback loop between the primary-side controller and the secondary-side controller as well as for exchanging other types of data, such as diagnostic information. By obviating the need for a dedicated communication channel to implement the feedback loop, a flyback power converter as described herein may be cheaper and be implemented with a smaller silicon footprint than other flyback power converters. Further, the techniques of the disclosure may enable to a flyback power converter to increase the accuracy of control over a secondary-side output voltage without requiring additional circuitry, such as transformer windings or feedback, thereby further reducing the size of the flyback power converter.

Figure 2:
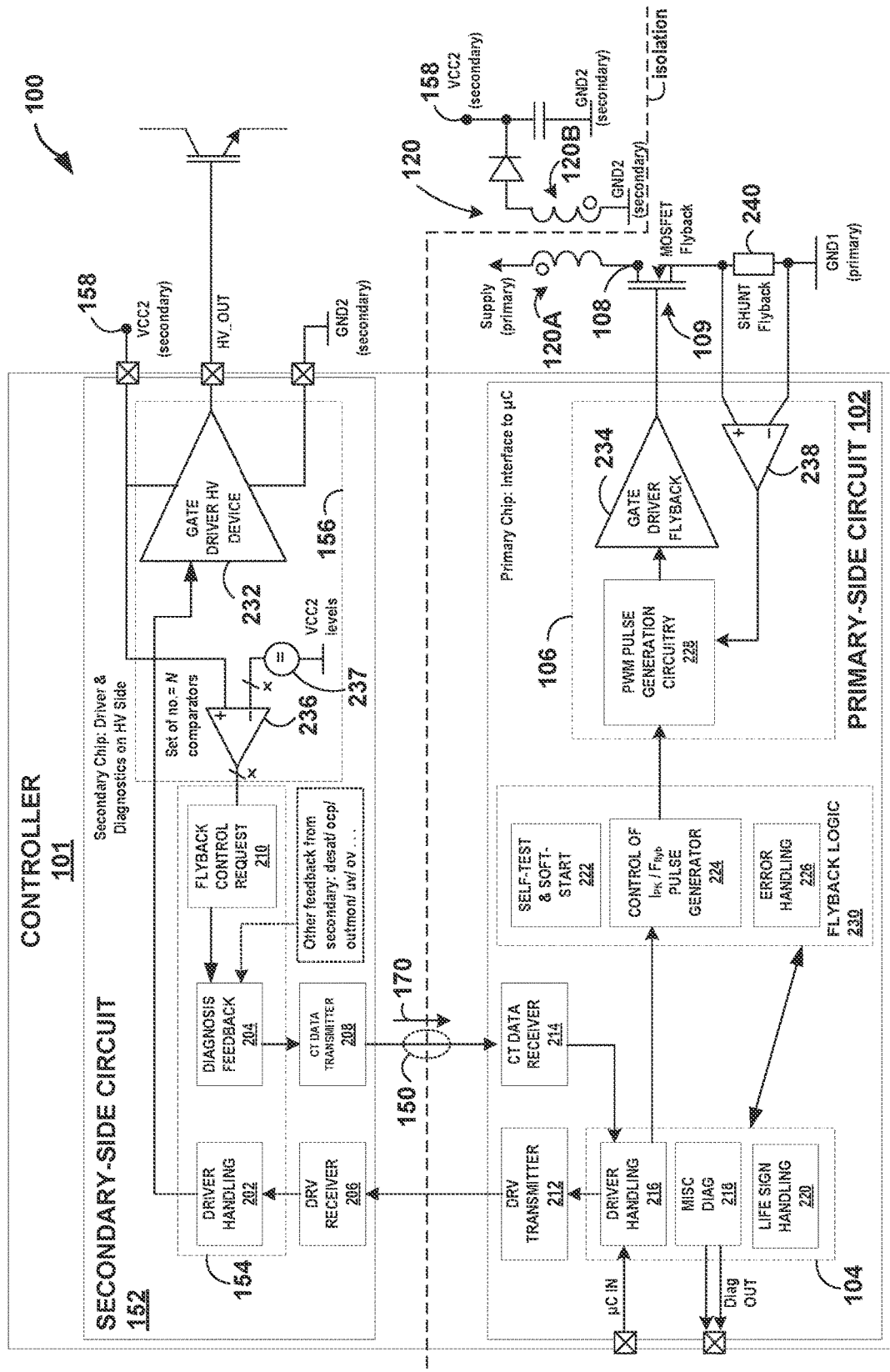
FIG. 2 is a block diagram illustrating the example flyback power converter system of FIG. 1 in further detail.

FIG. 2 is a block diagram illustrating example flyback power converter system 100 of FIG. 1 in further detail. Controller 101 comprises primary-side circuit 102 and secondary-side circuit 152. Primary-side circuit 102 comprises primary-side controller 104, primary-side flyback logic 230, and primary-side flyback drive circuitry 106. Secondary-side circuit 152 comprises secondary-side controller 154 and secondary-side flyback detection circuitry 156.

Communication channel 150 is a galvanically-isolated communication medium over which primary-side controller 104 and secondary-side controller 154 may communicate with one another. For example, secondary-side controller 154 may transmit data, such as diagnostic data or flyback power modes, to primary-side controller 104 over communication channel 150. In some examples, communication channel 150 is an optocoupler, one or more additional transformer windings, a dedicated isolation channel, and the like.

In accordance with the techniques of the disclosure, secondary-side controller 154 senses, via secondary-side flyback detection circuitry 156, an electrical characteristic of secondary-side output 158. Secondary-side controller 154 sends, over communication channel 150, feedback information based on the sensed electrical characteristic of secondary-side output 158 in the form of control message 150 specifying a power mode according to which primary-side controller 104 is to control primary-side flyback drive circuitry 106. Primary-side controller 104 receives, over communication channel 150, control message 150 from secondary-side controller 154. Primary-side controller 104 controls, according to the power mode specified by control message 150, primary-side flyback drive circuitry 106 to drive primary-side output 108, which in turn drives a value of the electrical characteristic of secondary-side output 158 to achieve a target value of the electrical characteristic of secondary-side output 158.

Secondary-side flyback detection circuitry 156 senses an electrical characteristic of secondary-side output 158. In some examples, the electrical characteristic of secondary-side output 158 is a voltage or a current. As depicted in the example of FIG. 2, secondary-side flyback detection circuitry 156 comprises high-voltage (HV) gate driver device 232 and a number "N" of comparators 236, where N may be any number. Gate driver device 232 outputs a high voltage signal to secondary-side load 160 of FIG. 1 (not depicted in FIG. 2). Comparators 236 sense a value of an electrical characteristic of secondary-side output 158 of flyback power converter system 100 and compare the sensed secondary-side output 158 to N predetermined thresholds 237. Comparators 236 output the resultant comparison to flyback control request 210 of secondary-side controller 154. In some examples, comparators 236 comprise 2 comparators (e.g., a first comparator 236 and a second comparator 236), and predetermined thresholds 237 comprise a first predetermined threshold and a second predetermined threshold. In some examples, the first predetermined threshold is selected from a range of greater than or equal to about 95% to less than or equal to about 99.5% of a target value of the sensed electrical characteristic. In some examples, the first predetermined threshold is 98% of the target value of the sensed electrical characteristic. In some examples, the second predetermined threshold is selected from a range of greater than or equal to about 100% to less than or equal to about 105% of the target value of the sensed electrical characteristic. In some examples, the second predetermined threshold is 101% of the target value of the sensed electrical characteristic. The first comparator 236 compares the sensed value of the electrical characteristic to the first predetermined threshold and the second comparator 236 compares the sensed value of the electrical characteristic to the second predetermined threshold.

Flyback control request 210 of secondary-side controller 154 determines, based on the output of comparators 236, whether a change is required to a power mode according to which primary-side controller 104 controls primary-side flyback drive circuitry 106. In some examples, primary-side controller 104 may control primary-side flyback drive circuitry 106 according to a high power mode, a low power mode, or a cycle skip power mode. For example, in response to receiving a signal from comparators 236 indicating that a sensed value of the electrical characteristic of secondary-side output 158 is less than the first predetermined threshold (e.g., less than a minimum target value), flyback control request 210 determines to switch primary-side flyback drive circuitry 106 to operation according to the high power mode. As another example, in response to receiving a signal from comparators 236 indicating that a sensed value of the electrical characteristic of secondary-side output 158 is greater than the second predetermined threshold (e.g., greater than a maximum target value), flyback control request 210 determines to switch primary-side flyback drive circuitry 106 to operation according to the cycle skip power mode. As another example, in response to receiving a signal from comparators 236 indicating that a sensed value of the electrical characteristic of secondary-side output 158 is transitioning from greater than the second predetermined threshold to less than or equal to the second predetermined threshold (e.g., the sensed value is falling below the maximum target value), flyback control request 210 determines to switch primary-side flyback drive circuitry 106 to operation according to the low power mode.

In response to determining that a change is required to the power mode according to which primary-side controller 104 controls primary-side flyback drive circuitry 106, flyback control request 210 passes a request for a change to the selected power mode to diagnosis feedback circuit 204, and diagnosis feedback circuit 204 combines the request for a change to the selected power mode with other diagnostic and/or feedback information from secondary-side circuit 152, such as desaturation information, overcurrent protection (OCP) data, secondary-side output 158 monitoring ("outmon"), undervoltage indicators, overvoltage indicators, etc. Coreless Transmitter (CT) data transmitter 208 formulates the request for a change to the selected power mode and diagnostic information into control message 150 comprising a header frame, the selected power mode, diagnostic information, and a checksum. Additional information with respect to the content of control message 150 is discussed below with respect to FIG. 7. CT data transmitter 208 transmits, via communication channel 150, control message 150 to CT data receiver 214 of primary-side circuit 102.

Primary-side controller 104 receives, over communication channel 150, control message 150 from secondary-side controller 154 and controls, according to the power mode specified by control message 150, primary-side flyback drive circuitry 106 to drive primary-side output 108. For example, CT data receiver 214 receives, via communication channel 150, control message 150 from CT data transmitter 208 of secondary-side circuit 152. CT data receiver 214 provides control message 150, including the specified power mode, to primary-side controller 104.

In the example of FIG. 2, primary-side flyback drive circuitry 106 comprises pulse-width modulation (PWM) generation circuitry 228 and gate driver flyback 234. To control primary-side flyback drive circuitry 106, driver handling circuit 216 causes pulse generator control circuitry 224 of flyback logic 230 to output one or more clock pulses according to a clock cycle to PWM generation circuitry 228. PWM pulse generation circuitry 228 receives clock pulses 410 and generates an output signal comprising a duty cycle for driving gate driver 234, which turns on MOSFET 109 to generate primary side energy (within first winding 120A)).

For example, during a clock cycle of primary-side controller 104, driver handling circuit 216 enables PWM generation circuitry 228 of primary-side flyback drive circuitry 106 so as to store electrical power within first winding 120A of flyback power converter system 100. Comparator 238 senses a value of an electrical characteristic of shunt flyback 240 (e.g., a voltage or a current) and compares the sensed value to a predetermined threshold (e.g., a peak current threshold). In response to determining that the sensed value of the electrical characteristic of shunt flyback 240 exceeds the predetermined threshold, PWM generation circuitry 228 disables output of the PWM drive signal, thereby disabling primary-side flyback drive circuitry 106 for the duration of the clock cycle to transfer the electrical power stored at primary-side output 108 to secondary-side output 158 of flyback power converter system 100.

In accordance with the techniques of the disclosure, driver handling circuit 216 of primary-side controller 104 identifies the power mode specified by control message 150 and controls primary-side flyback drive circuitry 106 according to the specified power mode. For example, to control primary-side flyback drive circuitry 106 according to the low power mode, driver handling circuit 216 outputs one or more clock pulses to pulse generator control circuitry 224, which cause pulse generator control circuitry 224 to output a first drive signal comprising a first amplitude to PWM generation circuitry 228. The first drive signal causes PWM generation circuitry 228 to output a first PWM drive signal to gate driver flyback 234 comprising a first duty cycle duration.

As another example, to control primary-side flyback drive circuitry 106 according to the high power mode, driver handling circuit 216 outputs one or more clock pulses to pulse generator control circuitry 224, which cause pulse generator control circuitry 224 to output a second drive signal comprising a second amplitude greater than the first amplitude to PWM generation circuitry 228. The second drive signal causes PWM generation circuitry 228 to output a second PWM drive signal to gate driver flyback 234 comprising a second duty cycle duration longer than the first duty cycle duration.

As another example, to control primary-side flyback drive circuitry 106 according to the cycle skip power mode, driver handling circuit 216 skips output of the one or more clock pulses for one or more clock cycles, which cause pulse generator control circuitry 224 to skip output of a drive signal, which in turn causes PWM generation circuitry 228 to skip output of a PWM drive signal to gate driver flyback 234. This in turn causes gate driver flyback 234 to not charge energy for the duration of the time primary-side flyback drive circuitry 106 operates according to the cycle skip power mode.

Primary-side controller 104 may select the amplitude of the drive signal (e.g., an amplitude output by pulse generator control circuitry 224) for the low power mode or the high power mode by tuning the selection of an $I_{PK}$ switch-off value set by comparators 238. Comparators 238 compare a voltage across flyback shunts 240. Flyback power converter system 100 may include a different shunt flyback for each power mode implemented by primary-side flyback drive circuitry 106 so as to allow different $I_{PK}$ switch-off values for different power modes. For example, the high power mode may allow a relatively higher $I_{PK}$ current while the low power mode may allow a relatively lower $I_{PK}$ current. Thus, the output of comparators 238 serve to effectively increase or decrease the duration of the PWM drive signal that PWM generation circuitry 228 outputs to gate driver flyback 234.

Flyback logic 230 further includes self-test and soft-start circuitry 222 and flyback error handling circuitry 226. Flyback error handling circuitry 226 may identify errors in the primary-side operation of flyback power transformer 100. Self-test and soft-start circuitry 222 enables primary-side flyback drive circuitry 106 to operate according to a safe power mode when communication with secondary-side controller 152 is lost. For example, primary-side flyback drive circuitry 106 may operate according to the safe power mode (also referred to herein as a "soft start" power mode) upon power-on of controller 101, in response to detecting a fault in communication channel 150, or in response to a fault in secondary-side circuit 152. The safe power mode may comprise one of a reduced power output or a reduced frequency of operation of primary-side drive circuitry 106. Primary-side flyback drive circuitry 106 may operate according to the safe power mode without feedback control from secondary-side controller 154.

In some examples, life sign handling 220 of primary-side controller 104 receives a periodic life sign control message from secondary-side controller 154. In the event that life sign handling 220 fails to receive a scheduled life sign control message from secondary-side controller 154, life sign handling 220 determines that a fault in communication channel 150 or secondary-side circuit 152 has occurred. In response to determining that the fault has occurred, primary-side controller 104 controls primary-side flyback drive circuitry 106 to operate according to the safe power mode.

Primary-side circuit 102 further includes miscellaneous diagnostics (MISC DIAG) circuitry 218 and drive (DRV) transmitter 212. MISC DIAG circuitry 218 enables controller 101 to output, via diagnostics output pins, diagnostic information to a user. DRV transmitter 212 may transmit secondary-side drive control information to DRV receiver 206 (e.g., via a communication channel not depicted in FIG. 2) to define an on-off state of gate driver HC device 232. DRV receiver 206 receives such secondary-side drive control information, which driver handling circuit 202 of secondary-side controller 154 may use to control operation of gate driver HV device 232.

Figure 3:
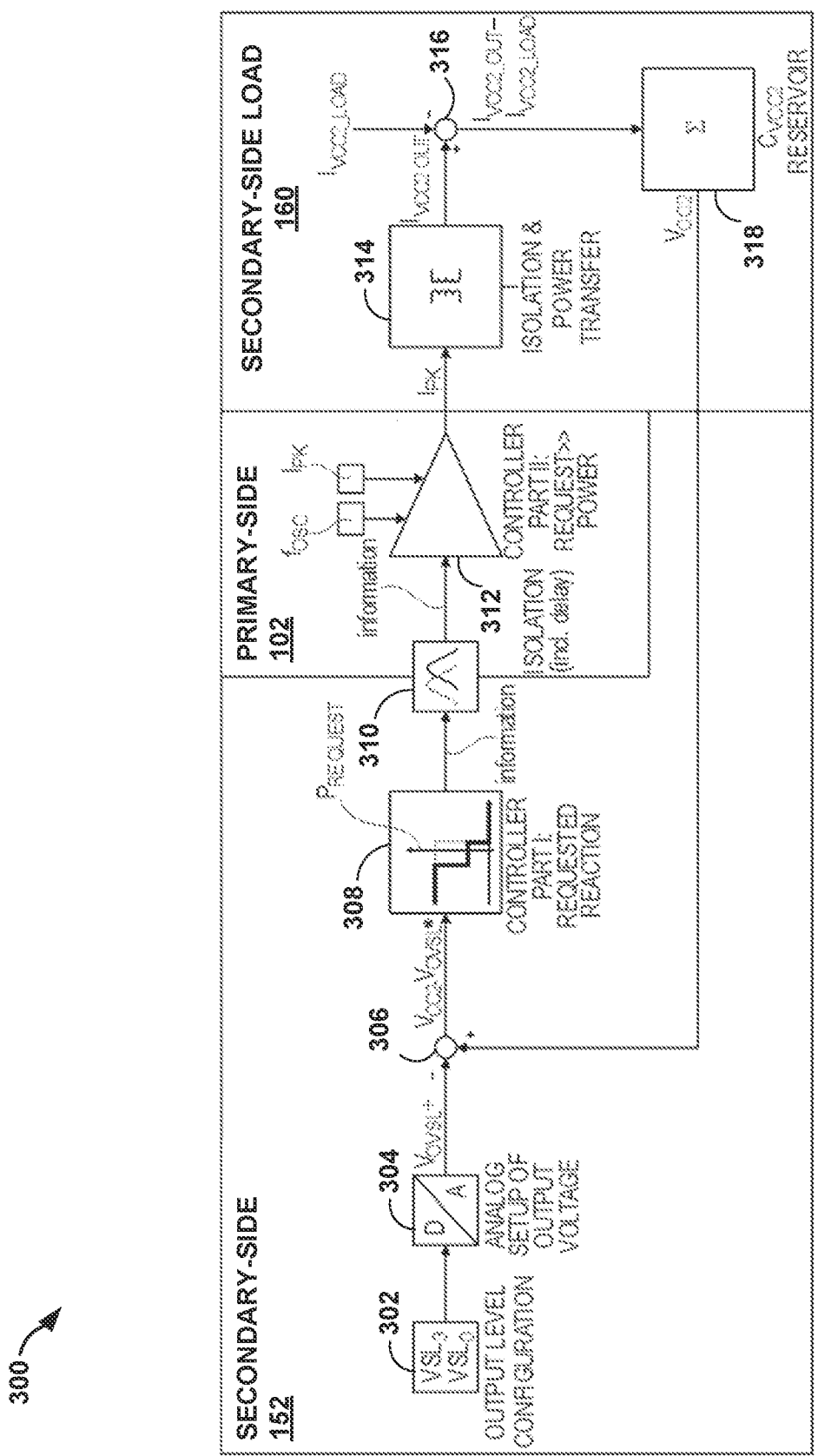
FIG. 3 is a block diagram illustrating an example control loop of a controller for the flyback power converter system of FIG. 1 in accordance with the techniques of the disclosure.

FIG. 3 is a block diagram illustrating an example control loop of a controller for the flyback power converter system of FIG. 1 in accordance with the techniques of the disclosure. For convenience, FIG. 3 is described with respect to FIGS. 1 and 2.

A user configures the desired value of an electrical characteristic of secondary-side output 158 (302). In some examples, the desired value is a target value for an output voltage of secondary-side output 158 or a target value for an output current of secondary-side output 158. The desired value of secondary-side output 158 is converted to predetermined thresholds for use by comparators 236 (304). In some examples, the desired value of secondary-side output 158 is converted to a first comparator voltage (corresponding to a first predetermined threshold) and a second comparator voltage (corresponding to a second predetermined threshold).

Secondary-side controller 154 determines a difference between a sensed value of the electrical characteristic of secondary-side output 158 and the target value for the electrical characteristic (306). In some examples, the difference is a voltage difference between a sensed voltage of secondary-side output 158 and a target voltage for secondary-side output 158.

Secondary-side controller 154 derives, from the voltage difference, a power request feedback (308). For example, secondary-side controller 154 selects a power mode according to which primary-side controller 104 controls primary-side flyback drive circuitry 106. Secondary-side controller 154 transmits, over communication channel 150, control message 170 specifying the selected power mode (310). In some examples, communication channel 150 is a digital transmission channel. In some examples, control message 170 additionally includes error correction and signal loss detection data.

Primary-side controller 104 controls primary-side flyback drive circuitry 106 according to the specified power mode (312). In some examples, primary-side controller 104 may additionally control primary-side flyback drive circuitry 106 according to other types of information, such as a configurable flyback switching frequency ($f_{OSC}$) or a configurable peak current ($I_{PK}$).

Secondary-side load 160 may include, e.g., external circuitry 314, which may take the form of a transformer and/or rectifying diodes. A difference 316 of an output current and a load current delivered to secondary load 160 is stored in external buffer 318 (e.g., a buffer cap), which adjusts the value of the electrical characteristic of secondary-side output 158, closing the feedback loop of flyback power converter system 100.

Figure 4:
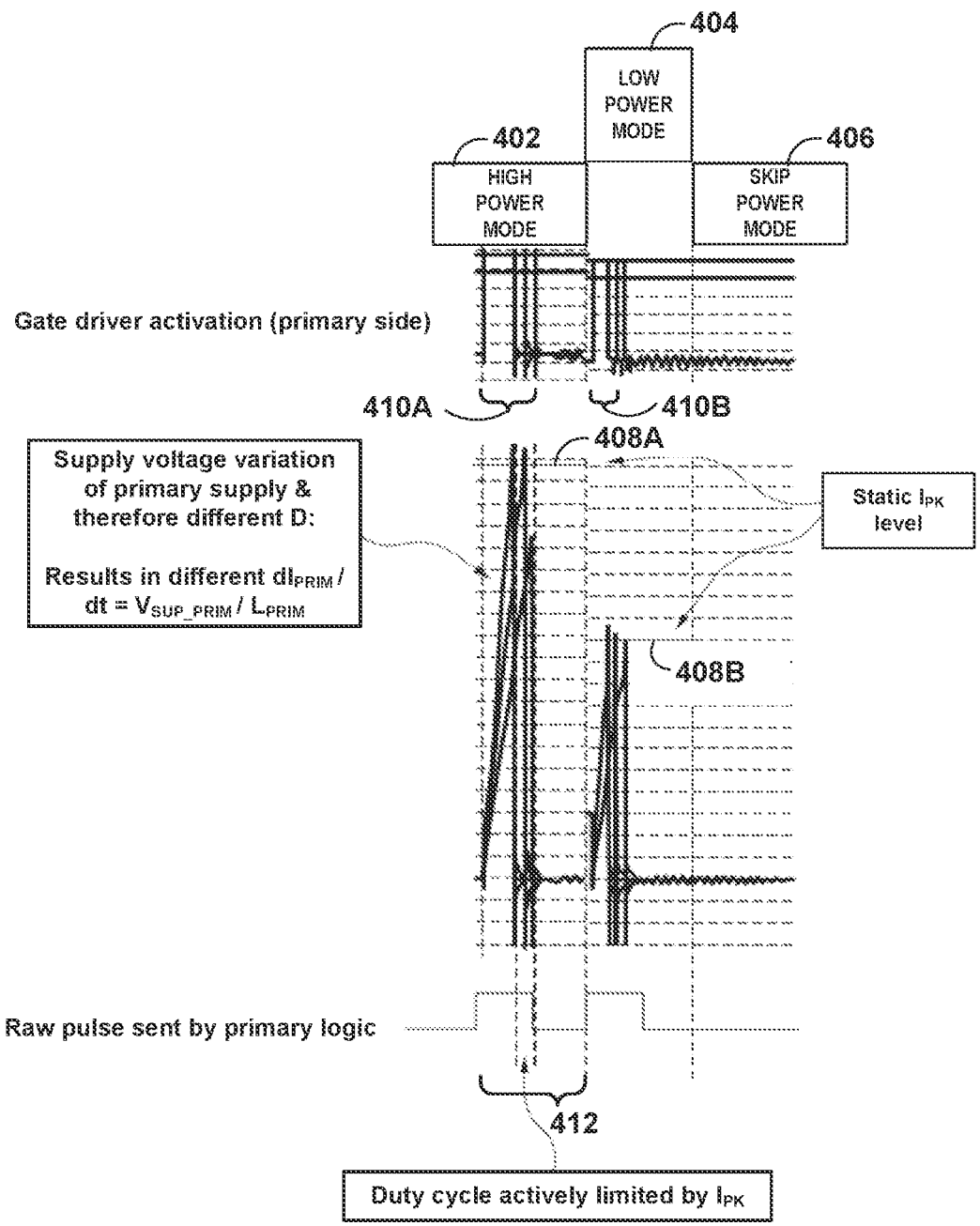
FIG. 4 is an illustration depicting example control signals of a primary-side controller for the flyback power converter system of FIG. 1 during operation according to different power modes in accordance with the techniques of the disclosure.

FIG. 4 is an illustration depicting example control signals of primary-side controller 104 for the flyback power converter system of FIG. 1 during operation according to different power modes in accordance with the techniques of the disclosure. For convenience, FIG. 4 is described with respect to FIGS. 1 and 2.

Primary-side controller 104 controls primary-side flyback drive circuitry 106 according to a plurality of power modes. For example, the plurality of power modes include a cycle skip power mode, a low power mode, and a high power mode. As described herein, primary-side controller 104 controls primary-side flyback drive circuitry 106 according to the cycle skip power mode while an electrical characteristic of secondary-side output 158 is greater than a target threshold (e.g., a maximum value of the electrical characteristic of secondary-side output 158). Primary-side controller 104 controls primary-side flyback drive circuitry 106 according to the low power mode while the electrical characteristic of secondary-side output 158 is less than or equal to a target threshold and greater than or equal to a low-target threshold (e.g., a minimum value of the electrical characteristic of secondary-side output 158). Further, primary-side controller 104 controls primary-side flyback drive circuitry 106 according to the high power mode while the electrical characteristic of secondary-side output 158 is less than the low-target threshold.

As illustrated in FIG. 4, to control primary-side flyback drive circuitry 106 according to the low power mode or high power mode, primary-side controller 104 outputs, to primary-side flyback drive circuitry 106, clock pulses 410 according to clock cycle 412. PWM pulse generation circuitry 228 receives clock pulses 410 and generates an output signal comprising a duty cycle for driving gate driver 234.

Primary-side controller 104 selects between the low power mode or high power mode via the selection of different reference voltages used by comparator 238 of FIG. 2. This in turn causes a relatively higher current $I_{PK}$ 408A through shunt 240 for the high power mode or a relatively lower current $I_{PK}$ 408B through shunt 240 for the low power mode. The higher current $I_{PK}$ 408A causes PWM pulse generation circuitry 228 to output a signal comprising a longer duty cycle 402 while operating according to the high power mode, while the lower current $I_{PK}$ 408B causes PWM pulse generation circuitry 228 to output a signal comprising shorter duty cycle 404. The length of the duty cycle that PWM pulse generation circuitry 228 delivers to gate driver 234 effectively controls the rate of energy transferred from primary-side output 108 to secondary-side output 158.

To control primary-side flyback drive circuitry 106 according to the cycle skip power mode, primary-side controller 104 skips output of clock pulses 410 to primary-side flyback drive circuitry 106 for at least one clock cycle 412. This effectively causes PWM pulse generation circuitry 228 to skip output of a duty signal to gate driver 234, thereby skipping transfer of energy to secondary-side output 158 for the at least one clock cycle 412.

Figure 5:
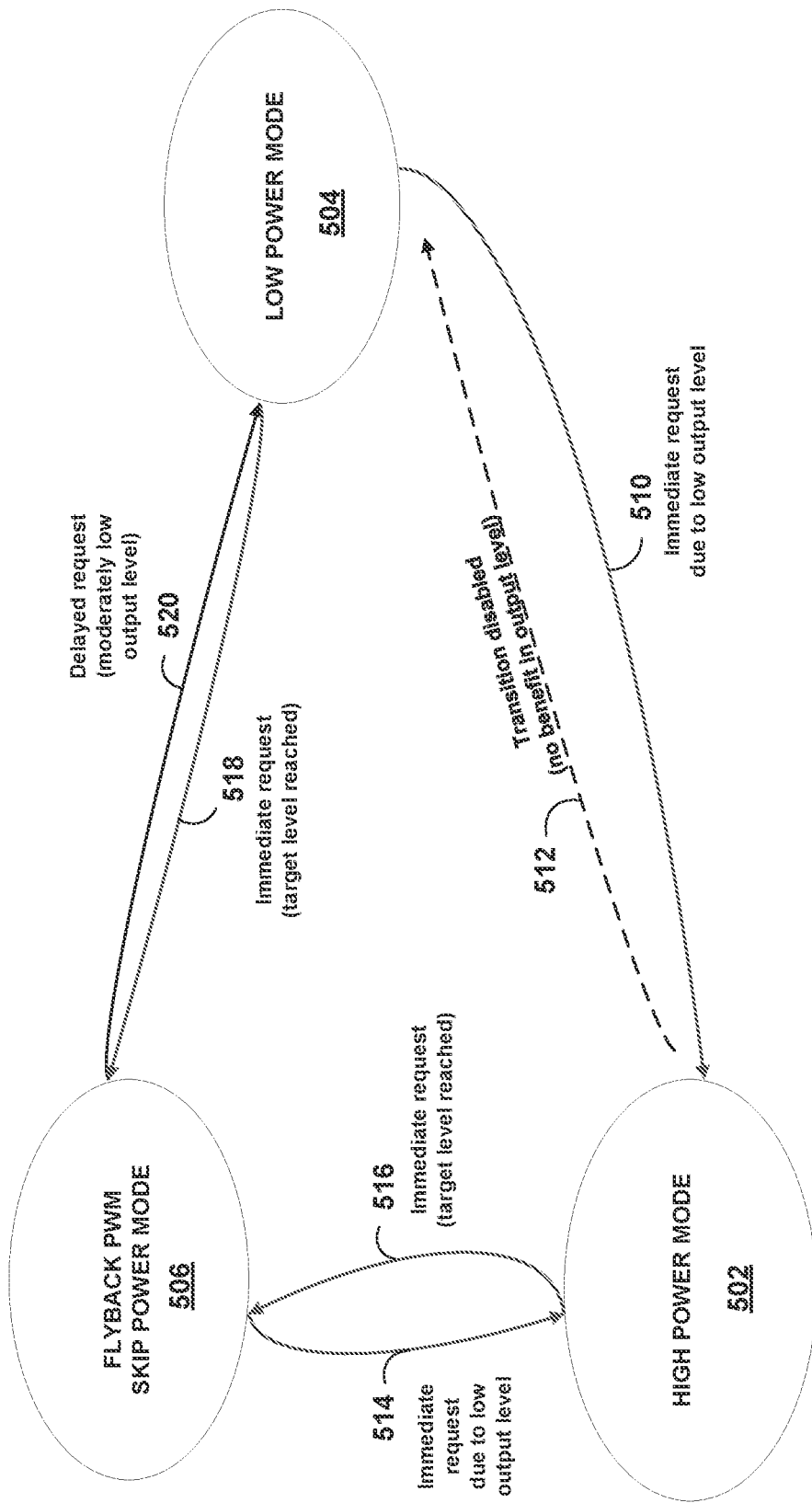
FIG. 5 is a block diagram illustrating an example state diagram for a controller for the flyback power converter system of FIG. 1 during operation according to different power modes in accordance with the techniques of the disclosure.

FIG. 5 is a block diagram illustrating an example state diagram for a controller for the flyback power converter system of FIG. 1 during operation according to different power modes in accordance with the techniques of the disclosure. In the example of FIG. 5, secondary-side controller 154 selects one of a low power mode, a high power mode, or a cycle skip power mode according to which primary-side controller 104 is to control primary-side drive circuitry 106. However, in other examples, secondary-side controller 154 may use more than 3 power modes.

As illustrated in the example of FIG. 5, secondary-side controller 154 causes primary-side controller 104 to transition from controlling primary-side flyback drive circuitry 106 according to high-power mode 502 to controlling primary-side flyback drive circuitry 106 according to skip power mode 506 in response to secondary-side controller 154 determining that a sensed electrical characteristic of secondary-side output 158 has reached a maximum target value (516). Further, secondary-side controller 154 causes primary-side controller 104 to transition from controlling primary-side flyback drive circuitry 106 according to skip power mode 506 to controlling primary-side flyback drive circuitry 106 according to high power mode 502 in response to secondary-side controller 154 determining that the sensed electrical characteristic of secondary-side output 158 has reached a minimum target value (514).

As another example, secondary-side controller 154 causes primary-side controller 104 to transition from controlling primary-side flyback drive circuitry 106 according to low-power mode 504 to controlling primary-side flyback drive circuitry 106 according to skip power mode 506 in response to secondary-side controller 154 determining that the sensed electrical characteristic of secondary-side output 158 has reached the maximum target value (518). Secondary-side controller 154 causes primary-side controller 104 to transition from controlling primary-side flyback drive circuitry 106 according to skip power mode 506 to controlling primary-side flyback drive circuitry 106 according to low power mode 504 in response to secondary-side controller 154 determining that the sensed electrical characteristic of secondary-side output 158 has fallen below the maximum target value (520).

In some examples, transition 514 may occur when secondary-side controller 154 detects a fast drop of the sensed electrical characteristic of secondary-side output 158. In some examples, transition 514, or transition 520 followed by transition 510, may occur when secondary-side controller 154 depending on the sensed electrical characteristic of secondary-side output 158 dropping below the minimum target level. For example, transition 514, or transition 520 followed by transition 510, may occur depending on a rate that the sensed electrical characteristic of secondary-side output 158 drops below the minimum target level (e.g., relatively quickly or relatively slowly).

As another example, secondary-side controller 154 causes primary-side controller 104 to transition from controlling primary-side flyback drive circuitry 106 according to low-power mode 504 to controlling primary-side flyback drive circuitry 106 according to high power mode 502 in response to secondary-side controller 154 determining that the sensed electrical characteristic of secondary-side output 158 has fallen below the minimum target value (510).

In contrast, typically, primary-side controller 104 does not transition primary-side flyback drive circuitry 106 from operation according to high power mode 502 to operation according to low power mode 504 (512) because transition from high power mode 502 to skip power mode 506 may instead be preferable in order to more rapidly and accurately decrease the electrical characteristic of secondary-side output 158 from the maximum target level. Furthermore, by removing transition 512, one may further decrease the bandwidth needed to implement the feedback channel of flyback power converter system 100.

As an illustration of the above, secondary-side controller 154 senses an electrical characteristic of secondary-side output 158. The electrical characteristic of secondary-side output 158 may be, e.g., a voltage or a current of secondary-side output 158. Secondary-side controller 154 compares a value of the sensed electrical characteristic of secondary-side output 158 to a first predetermined threshold and a second predetermined threshold. In some examples, the first predetermined threshold is selected from a range of greater than or equal to about 95% to less than or equal to about 99.5% of a target value of the sensed electrical characteristic. In some examples, the first predetermined threshold is 98% of the target value of the sensed electrical characteristic. In some examples, the second predetermined threshold is selected from a range of greater than or equal to about 100% to less than or equal to about 105% of the target value of the sensed electrical characteristic. In some examples, the second predetermined threshold is 101% of the target value of the sensed electrical characteristic.

In response to determining that the value of the sensed electrical characteristic is less than the first predetermined threshold (e.g., the sensed electrical characteristic of secondary-side output 158 is less than a minimum target value), secondary-side controller 154 selects high power mode 502 to increase the sensed electrical characteristic to the minimum target value. In response to determining that the value of the sensed electrical characteristic is greater than the second predetermined threshold (e.g., the sensed electrical characteristic of secondary-side output 158 is greater than a maximum target value), secondary-side controller 154 selects skip power mode 506 to reduce the sensed electrical characteristic to the maximum target value. In response to determining that the value of the sensed electrical characteristic is transitioning from greater than the second predetermined threshold to less than or equal to the second predetermined threshold (e.g., the sensed electrical characteristic of secondary-side output 158 exceeded the maximum target value and has fallen to below the maximum target value), secondary-side controller 154 selects low power mode 504.

Figure 6:
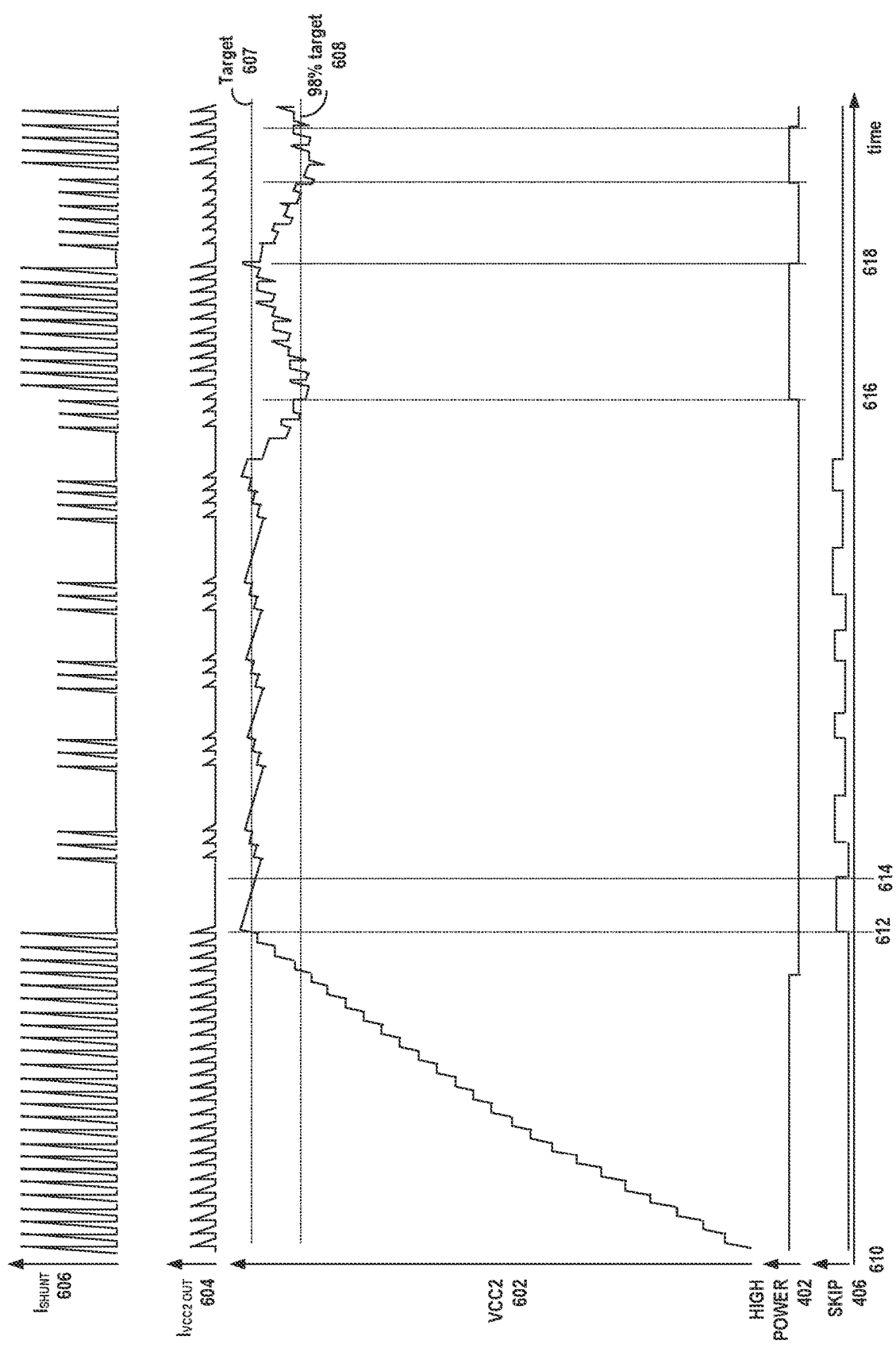
FIG. 6 is a graph illustrating example signals of the control loop (primary side and secondary side) of the flyback power converter system of FIG. 3 during operation according to different power modes in accordance with the techniques of the disclosure.

FIG. 6 is a graph illustrating example signals of the control loop (primary side and secondary side) of the flyback power converter system of FIG. 3 during operation according to different power modes in accordance with the techniques of the disclosure. FIG. 6 is described with respect to FIGS. 1 and 2 for convenience. VCC2 602 depicts a voltage at secondary-side output 158. $I_{VCC2\ OUT}$ 604 depicts a current at secondary-side output 158. $I_{SHUNT}$ 606 depicts a current through shunt 240.

As illustrated in the example of FIG. 6, secondary-side controller 154 uses control messages 170 transmitted over communication channel 150 to cause primary-side controller 104 to transition from operation according to different power modes.

For example, at time 610, controller 101 begins power regulation. Secondary-side controller 154 sends a control message 170 causing primary-side controller 104 to control primary-side flyback drive circuitry 106 according to the high power mode. At time 612, VCC2 602 exceeds target voltage 607. Secondary-side controller 154 sends a control message 170 causing primary-side controller 104 to control primary-side flyback drive circuitry 106 according to the cycle skip power mode. At time 614, VCC2 602 falls below target voltage 607. Secondary-side controller 154 sends a control message 170 causing primary-side controller 104 to control primary-side flyback drive circuitry 106 according to the low power mode. Secondary-side controller 154 continues to cause primary-side controller 104 to toggle between skip power mode and low power mode until time 616. At time 616, VCC2 602 falls below minimum target voltage 607. Secondary-side controller 154 sends a control message 170 causing primary-side controller 104 to transition from controlling primary-side flyback drive circuitry 106 according to the low power mode to controlling primary-side flyback drive circuitry 106 according to the high power mode. At time 618, VCC2 602 exceeds target voltage 607 and secondary-side controller 154 again sends a control message 170 causing primary-side controller 104 to control primary-side flyback drive circuitry 106 according to the cycle skip power mode.

Figure 7:
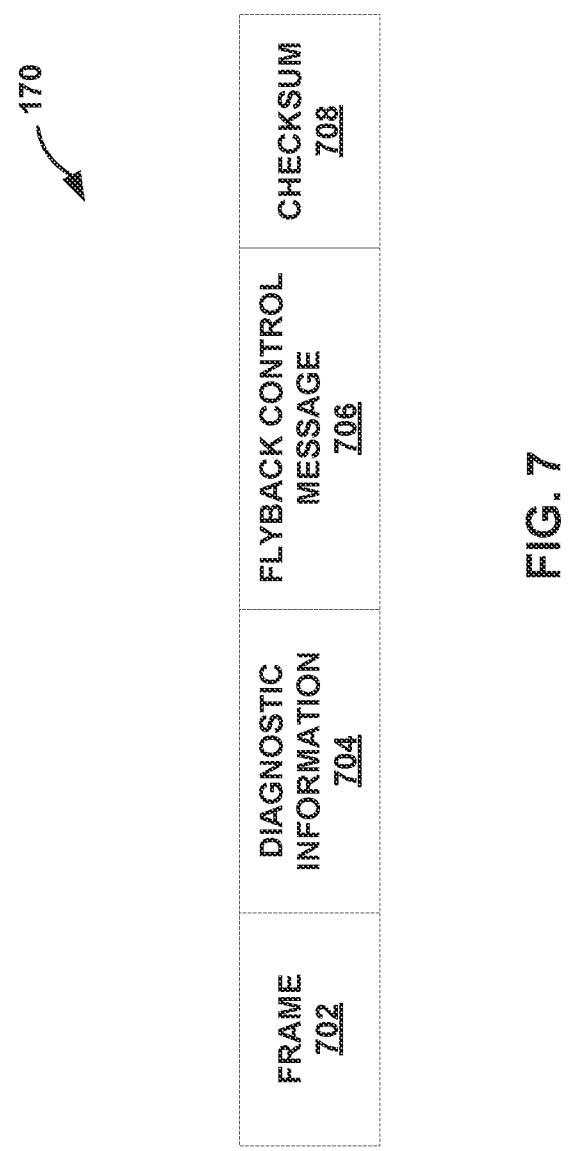
FIG. 7 is an example of a control message for specifying a power mode of the flyback power converter system of FIG. 1 in accordance with the techniques of the disclosure.

FIG. 7 is an example of control message 170 for specifying a power mode of flyback power converter system 100 of FIG. 1 in accordance with the techniques of the disclosure. Control message 170 comprises header frame field 170, diagnostic information field 704, flyback control message field 706, and checksum field 708.

In some examples, header frame field 170 is a 3 bit field that specifies a type of data carried by control message 170. As depicted in FIG. 7, for example, header frame field 170 indicates that control message 170 specifies a power mode of flyback power converter system 100.

In some examples, control message 170 optionally includes diagnostic information field 704. Diagnostic information field 704 may specify, for example, diagnostics related to the operation of secondary-side 152 of flyback power converter system 100. In some examples, diagnostic information field 704 indicates the presence of a desaturation, overcurrent, or other type of fault in operation of flyback power converter system 100.

In some examples, control message 170 optionally includes checksum field 708. Checksum field 708 includes data that primary-side controller 104 may use to verify the integrity of control message 170.

Flyback control message field 706 specifies a power mode selected by secondary-side controller 154. Secondary-side controller 154 may use flyback control message field 706 of control message 170 to specify the power mode according to which primary-side controller 104 controls primary-side drive circuitry 106. In some examples, flyback control message field 706 comprises 2, 3, 4, or more bits.

In some examples, flyback control message field 706 comprises 2 bits, which may be used to specify a cycle skip power mode, a low power mode, a high power mode, or a safe power mode. In this example, secondary-side controller 154 selects the cycle skip power mode in response to determining that an electrical characteristic of secondary-side output 158 is greater than a target threshold. Secondary-side controller 154 selects the low power mode in response to determining that the electrical characteristic of secondary-side output 158 is less than or equal to a target threshold and greater than or equal to a low-target threshold. Further, secondary-side controller 154 selects the high power mode in response to determining that the electrical characteristic of secondary-side output 158 is less than the low-target threshold.

Secondary-side controller 154 selects the safe power mode in response to detecting a safe-mode trigger, which may occur upon power-on of controller 101 or upon detecting a fault in communication channel 150. The safe power mode may comprise one of a reduced power output or a reduced frequency of operation of primary-side drive circuitry 106.

In some examples, flyback control message field 706 comprises 3 bits, which may be used to specify an optional non-maskable skip power mode, a cycle skip power mode, a low power mode, an optional mid-power mode, a high power mode, a first safe power mode, a second safe power mode, or a third safe power mode. In this example, secondary-side controller 154 selects the non-maskable skip power mode in response to detecting an overvoltage or overcurrent warning on secondary-side output 158. Secondary-side controller 154 selects the cycle skip power mode in response to determining that an electrical characteristic of secondary-side output 158 is greater than a target threshold. Secondary-side controller 154 selects the low power mode in response to determining that the electrical characteristic of secondary-side output 158 is less than or equal to a target threshold and greater than a first low-target threshold. Further, secondary-side controller 154 selects the mid-power mode in response to determining that the electrical characteristic of secondary-side output 158 is less than or equal to the first low-target threshold and greater than a second low-target threshold. Further, secondary-side controller 154 selects the high power mode in response to determining that the electrical characteristic of secondary-side output 158 is less than the second low-target threshold.

In this example, secondary-side controller 154 may select one of the first, second, or third safe power modes in response to detecting different types of safe power mode triggers. For example, secondary-side controller 154 may select different safe power modes that specify different values of reduced power output or a reduced frequency of operation of primary-side drive circuitry 106 depending on whether secondary-side controller 154 detects power-on of controller 101 or upon detecting a fault in communication channel 150.

In other types of flyback power converters, the secondary-side controller may transmit, over a communication channel, data indicating detected values of an electrical characteristic of a secondary-side output of the flyback power converter to the primary-side controller. The primary-side controller uses such data as a feedback loop to control the primary-side drive circuitry to drive the primary-side output, thereby controlling the secondary-side output. However, such an implementation may require the secondary-side controller to transmit such data at twice the clock frequency of the primary-side controller (e.g., adhering to the Nyquist theorem) to enable the primary-side controller to sufficiently monitor the secondary-side output and adjust the primary-side drive circuitry accordingly. For example, where a primary-side controller operates according to a clock frequency of about 100-500 kilohertz (kHz), the secondary-side controller senses load changes at the secondary-side output and may be required to transmit such data to the primary-side controller at a frequency of 200-1,000 kHz (e.g., to satisfy the Nyquist theorem with respect to the clock frequency of the primary-side controller). Such a large quantity of data is very resource-intensive, and may require a dedicated channel to implement the feedback loop of such a flyback power converter. Furthermore, 8 bits of data may be required to represent each detected value of the electrical characteristic of the secondary-side output.

In accordance with the techniques of the disclosure, the use of flyback control message field 706 of control message 170 enables secondary-side controller 154 to select the power mode according to which primary-side controller 104 controls primary-side drive circuitry 106, thereby obviating the need to transmit the sensed values of the electrical characteristic of the secondary-side output across communication channel 150. In this way, the use of flyback control message field 706 enables secondary-side controller 154 to transmit control message 170 to primary-side controller 104 at a frequency that is substantially less often than the clock frequency of primary-side controller 104. In some examples, secondary-side controller 154 may transmit control message 170 to primary-side controller 104 at a frequency that is about 30%-40% of the clock frequency of primary-side controller 104. Furthermore, the use of flyback control message field 706 enables secondary-side controller 154 to implement the feedback loop of flyback power converter with, e.g., only 2 bits to specify the selected power mode. In this fashion, a flyback power converter as described herein may not require a dedicated communication channel to implement the feedback component of the flyback power converter. For example, flyback power converter system 100 may use a shared communication channel 150 that may be used to carry both diagnostic information as well as data for the feedback component of the flyback power converter. By requiring fewer communication channels than other flyback power converters, a flyback power converter as described herein may be cheaper and be implemented with a smaller silicon footprint than other flyback power converters.

Figure 8:
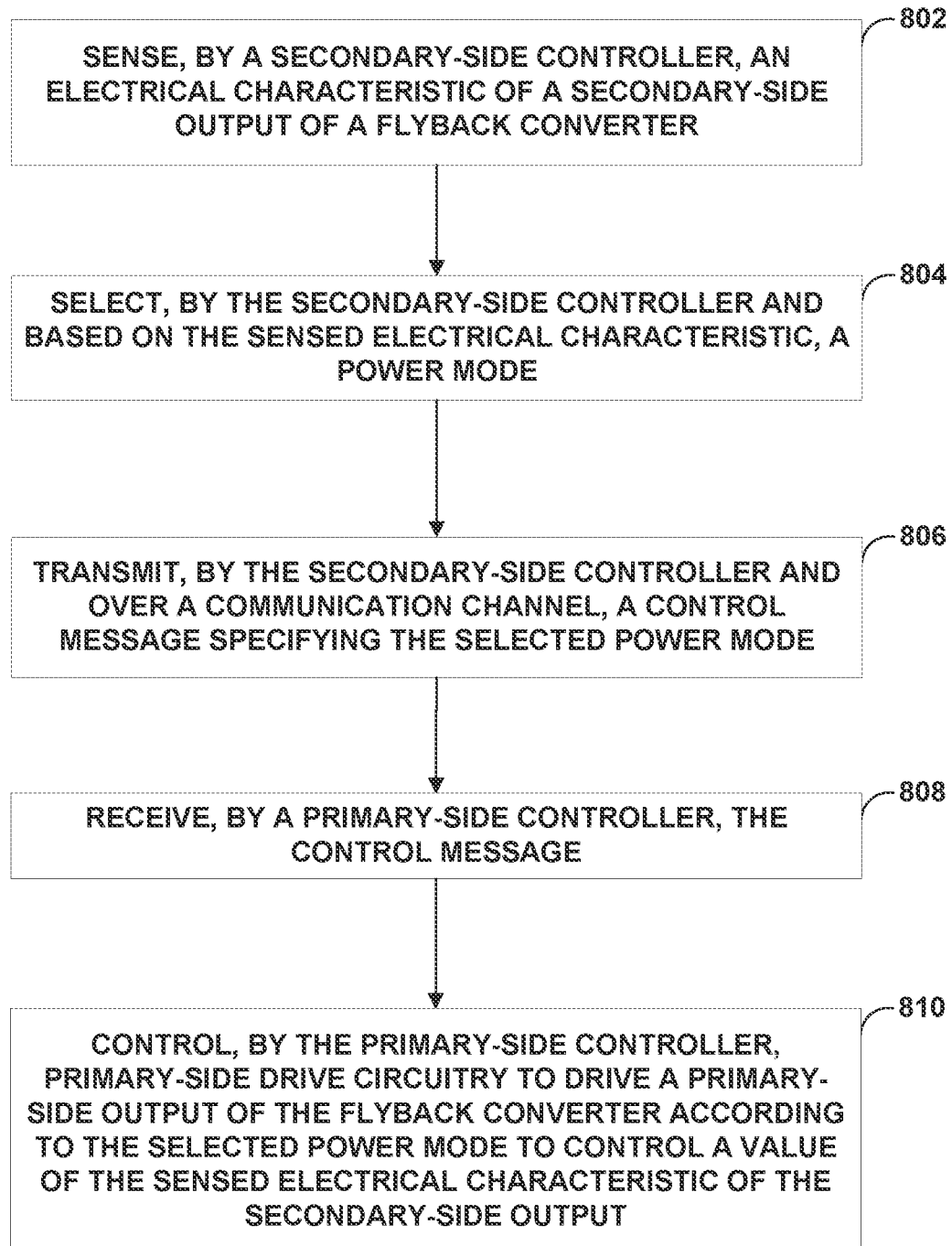
FIG. 8 is a flowchart illustrating an example operation of a controller for the flyback power converter system of FIG. 1 in accordance with the techniques of the disclosure.

FIG. 8 is a flowchart illustrating an example operation of controller 101 for flyback power converter system 101 of FIG. 1 in accordance with the techniques of the disclosure. FIG. 8 is described with respect to FIGS. 1 and 2 for convenience. As depicted in the example of FIG. 8, primary-side controller 104 controls primary-side flyback drive circuitry 106 to drive primary-side output 108 so as to achieve a target value of an electrical characteristic of secondary-side output 158. Further, primary-side controller 104 uses control messages 170 received from secondary-side controller 154 to control primary-side flyback drive circuitry 106 to operate according to a specified power mode.

For example, secondary-side controller 154 senses an electrical characteristic of secondary-side output 158 of flyback power controller system 100 (802). For example, comparators 236 of secondary-side flyback detection circuitry 156 sense a value of the electrical characteristic of secondary-side output 158 of flyback power converter system 100. In some examples, the electrical characteristic of secondary-side output 158 is a voltage or a current.

Secondary-side controller 154 selects, based on the sensed electrical characteristic, a power mode of a plurality of power modes (804). For example, comparators 236 compare the sensed secondary-side output 158 to predetermined thresholds 237. In some examples, comparators 236 comprise 2 comparators (e.g., a first comparator 236 and a second comparator 236), and predetermined thresholds 237 comprise a first predetermined threshold (e.g., a minimum target value for the electrical characteristic of secondary-side output 158) and a second predetermined threshold (e.g., a maximum target value for the electrical characteristic of secondary-side output 158). Comparators 236 output the resultant comparison to flyback control request 210. With respect to the foregoing example, the first comparator 236 compares the sensed value of the electrical characteristic to the first predetermined threshold and outputs the resultant comparison to flyback control request 210. The second comparator 236 compares the sensed value of the electrical characteristic to the second predetermined threshold and outputs the resultant comparison to flyback control request 210.

Flyback control request 210 of secondary-side controller 154 determines, based on the output of comparators 236, whether a change is required to a power mode according to which primary-side controller 104 controls primary-side flyback drive circuitry 106. In some examples, primary-side controller 104 may control primary-side flyback drive circuitry 106 according to a high power mode, a low power mode, or a cycle skip power mode. For example, in response to receiving a signal from comparators 236 indicating that a sensed value of the electrical characteristic of secondary-side output 158 is less than the first predetermined threshold (e.g., less than a minimum target value), flyback control request 210 determines to switch primary-side flyback drive circuitry 106 to operation according to the high power mode. As another example, in response to receiving a signal from comparators 236 indicating that a sensed value of the electrical characteristic of secondary-side output 158 is greater than the second predetermined threshold (e.g., greater than a maximum target value), flyback control request 210 determines to switch primary-side flyback drive circuitry 106 to operation according to the cycle skip power mode. As another example, in response to receiving a signal from comparators 236 indicating that a sensed value of the electrical characteristic of secondary-side output 158 is transitioning from greater than the second predetermined threshold to less than or equal to the second predetermined threshold (e.g., the sensed value is falling below the maximum target value), flyback control request 210 determines to switch primary-side flyback drive circuitry 106 to operation according to the low power mode.

Secondary-side controller 154 transmits, over communication channel 150, control message 170 specifying the selected power mode (806). For example, flyback control request 210 passes a request for a change to the selected power mode to diagnosis feedback circuit 204, and diagnosis feedback circuit 204 combines the request for a change to the selected power mode with other diagnostic and/or feedback information from secondary-side circuit 152. CT data transmitter 208 formulates the request for a change to the selected power mode and diagnostic information into control message 150 comprising a header frame, the selected power mode, diagnostic information, and a checksum. CT data transmitter 208 transmits, via communication channel 150, control message 150 to CT data receiver 214 of primary-side circuit 102.

Primary-side controller 104 receives, over communication channel 150, control message 170 from secondary-side controller 154 (808). For example, CT data receiver 214 receives, via communication channel 150, control message 150 from CT data transmitter 208 of secondary-side circuit

152. CT data receiver 214 provides control message 150, including the specified power mode, to primary-side controller 104.

Primary-side controller 104 controls primary-side flyback drive circuitry 106 to drive primary-side output 108 of flyback power converter system 100 according to the selected power mode to control a value of the electrical characteristic of secondary-side output 158 of flyback power converter system 100 (810). For example, driver handling circuit 216 of primary-side controller 104 identifies the power mode specified by control message 150. Where the specified power mode is the low power mode or the high power mode, driver handling circuit 216 and pulse generator control circuitry 224 drive PWM pulse generation circuitry 228 to output a drive signal to drive gate driver flyback 234 according to the specified power mode. Where the specified power mode is the cycle skip power mode, driver handling circuit 216 and pulse generator control circuitry 224 control PWM pulse generation circuitry 228 to skip output of the drive signal until exiting the cycle skip power mode by returning to the low power mode or the high power mode.

The following examples may illustrate one or more aspects of the disclosure.

Example 1

A controller for a flyback power converter comprising a secondary-side circuit comprising a secondary-side controller configured to: sense an electrical characteristic of a secondary-side output of the flyback power converter; select, based on the sensed electrical characteristic, a power mode of a plurality of power modes; and transmit, over a communication channel, a control message specifying the selected power mode; and a primary-side circuit isolated from the secondary-side circuit, the primary-side circuit comprising a primary-side controller configured to: receive, over the communication channel, the control message specifying the selected power mode; and control primary-side flyback drive circuitry of the primary-side circuit to drive a primary-side output of the flyback power converter according to the selected power mode to control a value of the electrical characteristic of the secondary-side output of the flyback power converter.

Example 2

The controller of example 1, wherein the plurality of power modes comprises at least a low power mode, a high power mode, and a cycle skip power mode.

Example 3

The controller of example 2, wherein to select the power mode of the plurality of power modes, the secondary-side controller is configured to: in response to determining that a value of the sensed electrical characteristic is less than a first predetermined threshold, select the high power mode; in response to determining that the value of the sensed electrical characteristic is transitioning from greater than a second predetermined threshold to less than or equal to the second predetermined threshold, select the low power mode; and in response to determining that the value of the sensed electrical characteristic is greater than the second predetermined threshold, select the cycle skip power mode.

Example 4

The controller of example 3, wherein the first predetermined threshold is selected from a range of greater than or equal to about 95% to less than or equal to about 99.5% of a target value of the sensed electrical characteristic, and wherein the second predetermined threshold is selected from a range of greater than or equal to about 100% to less than or equal to about 105% of the target value of the sensed electrical characteristic.

Example 5

The controller of any of examples 3 and 4, wherein the secondary-side controller further comprises: a first comparator configured to compare the value of the sensed electrical characteristic to the first predetermined threshold; and a second comparator configured to compare the value of the sensed electrical characteristic to the second predetermined threshold.

Example 6

The controller of any of examples 2 through 5, wherein the primary-side flyback drive circuitry is configured to drive the primary-side output of the flyback power converter to achieve a target value of the electrical characteristic of the secondary-side output of the flyback power converter, and wherein to control the primary-side flyback drive circuitry to drive the primary-side output of the flyback power converter according to the selected power mode, the primary-side controller is configured to: output, to the primary-side flyback drive circuitry, one or more clock pulses configured to cause the primary-side flyback drive circuitry to output, according to a duty cycle, a first drive signal comprising a first amplitude while operating according to the low power mode; output, to the primary-side flyback drive circuitry, the one or more clock pulses configured to cause the primary-side flyback drive circuitry to output, according to the duty cycle, a second drive signal comprising a second amplitude greater than the first amplitude while operating according to the high power mode; and skip output of the one or more clock pulses to the primary-side flyback drive circuitry for one or more clock cycles to cause the primary-side flyback drive circuitry to skip output for the one or more clock cycles while operating according to the cycle skip power mode.

Example 7

The controller of example 6, wherein the primary-side flyback drive circuitry comprises: a pulse-width modulation circuit; and a gate driver operably coupled to an output of the pulse-width modulation circuit.

Example 8

The controller of any of examples 1 through 7, wherein the electrical characteristic of a secondary-side output of the flyback power converter comprises a first electrical characteristic, wherein the primary-side flyback drive circuitry is configured to drive the primary-side output of the flyback power converter to achieve a target value of the electrical characteristic of the secondary-side output of the flyback power converter, and wherein the primary-side controller is further configured to: enable the primary-side flyback drive circuitry so as to store electrical power in the primary-side output of the flyback power converter; sense a second electrical characteristic of the primary-side of the flyback power converter; in response to determining that a value of the second sensed electrical characteristic is greater than a predetermined threshold, disable, for a clock cycle, the primary-side flyback drive circuitry to transfer the electrical power to the secondary-side output of the flyback power converter.

Example 9

The controller of any of examples 1 through 8, wherein the control message specifying the selected power mode comprises: a header frame; the selected power mode; and a checksum.

Example 10

The controller of any of examples 1 through 9, wherein the primary-side controller comprises a clock frequency, and wherein to transmit the control message specifying the selected power mode, the secondary-side controller is configured to transmit, less often than the clock frequency of the primary-side controller, a control message comprising 2 bits that specify the selected power mode.

Example 11

The controller of any of examples 1 through 10, wherein, at one of a power-on of the controller or a fault in the communication channel, the primary-side controller is configured to control the primary-side flyback drive circuitry to drive the primary-side output of the flyback power converter according to a safe power mode, wherein, during operation according to the safe power mode, the primary-side controller does not receive control messages from the secondary-side controller, and wherein, after receiving the control message from the secondary-side controller, the primary-side controller is configured to switch from controlling the primary-side flyback drive circuitry to drive the primary-side output of the flyback power converter according to a safe power mode to controlling the primary-side flyback drive circuitry to drive the primary-side output of the flyback power converter according to the selected power mode of the plurality of power modes.

Example 12

The controller of any of examples 1 through 11, wherein the electrical characteristic of the secondary-side output of the flyback power converter comprises one of a voltage or a current of the secondary-side output of the flyback power converter.

Example 13

The controller of any of examples 1 through 12, wherein a first semiconductor die comprises the primary-side circuit, wherein a second semiconductor die comprises the secondary-side circuit, wherein the communication channel comprises a high-voltage isolation channel between the first semiconductor die and the second semiconductor die, and wherein a single package comprises the first semiconductor die, the second semiconductor die, and the high-voltage isolation channel.

Example 14

A method comprising sensing, by a secondary-side controller of a secondary-side circuit of a controller for a flyback power converter, an electrical characteristic of a secondary-side output of the flyback power converter; selecting, by the secondary-side controller and based on the sensed electrical characteristic, a power mode of a plurality of power modes; transmitting, by the secondary-side controller and over a communication channel, a control message specifying the selected power mode; receiving, by a primary-side controller of a primary-side circuit of the controller and over the communication channel, the control message specifying the selected power mode, wherein the primary-side circuit is isolated from the secondary-side circuit; and controlling, by the primary-side controller, primary-side flyback drive circuitry of the primary-side circuit to drive a primary-side output of the flyback power converter according to the selected power mode to control a value of the electrical characteristic of the secondary-side output of the flyback power converter.

Example 15

The method of example 14, wherein the plurality of power modes comprises at least a low power mode, a high power mode, and a cycle skip power mode.

Example 16

The method of example 15, wherein selecting the power mode of the plurality of power modes comprises: in response to determining that a value of the sensed electrical characteristic is less than a first predetermined threshold, selecting the high power mode; in response to determining that the value of the sensed electrical characteristic is transitioning from greater than a second predetermined threshold to less than or equal to the second predetermined threshold, selecting the low power mode; and in response to determining that the value of the sensed electrical characteristic is greater than the second predetermined threshold, selecting the cycle skip power mode.

Example 17

The method of example 16, wherein controlling the primary-side flyback drive circuitry to drive the primary-side output of the flyback power converter according to the selected power mode comprises: outputting, to the primary-side flyback drive circuitry, one or more clock pulses configured to cause the primary-side flyback drive circuitry to output, according to a duty cycle, a first drive signal comprising a first amplitude while operating according to the low power mode; outputting, to the primary-side flyback drive circuitry, the one or more clock pulses configured to cause the primary-side flyback drive circuitry to output, according to the duty cycle, a second drive signal comprising a second amplitude greater than the first amplitude while operating according to the high power mode; and skipping output of the one or more clock pulses to the primary-side flyback drive circuitry for one or more clock cycles to cause the primary-side flyback drive circuitry to skip output for the one or more clock cycles while operating according to the cycle skip power mode.

Example 18

The method of any of examples 16 and 17, wherein the electrical characteristic of a secondary-side output of the flyback power converter comprises a first electrical characteristic, and wherein the method further comprises: driving, by the primary-side flyback drive circuitry, the primary-side output of the flyback power converter to achieve a target value of the electrical characteristic of the secondary-side output of the flyback power converter enabling, by the primary-side controller, the primary-side flyback drive circuitry so as to store electrical power in the primary-side output of the flyback power converter; sensing, by the primary-side controller, a second electrical characteristic of the primary-side of the flyback power converter; in response to determining that a value of the second sensed electrical characteristic is greater than a predetermined threshold, disabling, by the primary-side controller and for a clock cycle, the primary-side flyback drive circuitry to transfer the electrical power to the secondary-side output of the flyback power converter.

Example 19

The method of any of examples 16 through 18, wherein the primary-side controller comprises a clock frequency, and wherein transmitting the control message specifying the selected power mode comprises transmitting, less often than the clock frequency of the primary-side controller, a control message comprising 2 bits that specify the selected power mode.

Example 20

A system comprising a gate driver configured to drive a primary-side output of the flyback power converter; and a controller for a flyback power converter comprising a secondary-side circuit comprising a secondary-side controller configured to: sense an electrical characteristic of a secondary-side output of the flyback power converter; select, based on the sensed electrical characteristic, a power mode of a plurality of power modes; and transmit, over a communication channel, a control message specifying the selected power mode; and a primary-side circuit isolated from the secondary-side circuit, the primary-side circuit comprising a primary-side controller configured to: receive, over the communication channel, the control message specifying the selected power mode; and control the gate driver to drive a primary-side output of the flyback power converter according to the selected power mode to control a value of the electrical characteristic of the secondary-side output of the flyback power converter.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A controller for a flyback power converter comprising:
a secondary-side circuit comprising:
a secondary-side controller configured to:
sense an electrical characteristic of a secondary-side output of the flyback power converter;
select, based on the sensed electrical characteristic, a power mode of a plurality of power modes; and
transmit, over a communication channel, a control message specifying the selected power mode; and
a primary-side circuit isolated from the secondary-side circuit, the primary-side circuit comprising:
a primary-side controller configured to:
receive, over the communication channel, the control message specifying the selected power mode; and
control primary-side flyback drive circuitry of the primary-side circuit to drive a primary-side output of the flyback power converter according to the selected power mode to control a value of the electrical characteristic of the secondary-side output of the flyback power converter.

2. The controller of claim 1, wherein the plurality of power modes comprises at least a low power mode, a high power mode, and a cycle skip power mode.

3. The controller of claim 2, wherein to select the power mode of the plurality of power modes, the secondary-side controller is configured to:
in response to determining that a value of the sensed electrical characteristic is less than a first predetermined threshold, select the high power mode;
in response to determining that the value of the sensed electrical characteristic is transitioning from greater than a second predetermined threshold to less than or equal to the second predetermined threshold, select the low power mode; and
in response to determining that the value of the sensed electrical characteristic is greater than the second predetermined threshold, select the cycle skip power mode.

4. The controller of claim 3,
wherein the first predetermined threshold is selected from a range of greater than or equal to about 95% to less than or equal to about 99.5% of a target value of the sensed electrical characteristic, and wherein the second predetermined threshold is selected from a range of greater than or equal to about 100% to less than or equal to about 105% of the target value of the sensed electrical characteristic.

5. The controller of claim 3, wherein the secondary-side controller further comprises:
a first comparator configured to compare the value of the sensed electrical characteristic to the first predetermined threshold; and
a second comparator configured to compare the value of the sensed electrical characteristic to the second predetermined threshold.

6. The controller of claim 2,
wherein the primary-side flyback drive circuitry is configured to drive the primary-side output of the flyback power converter to achieve a target value of the electrical characteristic of the secondary-side output of the flyback power converter, and
wherein to control the primary-side flyback drive circuitry to drive the primary-side output of the flyback power converter according to the selected power mode, the primary-side controller is configured to:
output, to the primary-side flyback drive circuitry, one or more clock pulses configured to cause the primary-side flyback drive circuitry to output, according to a duty cycle, a first drive signal comprising a first amplitude while operating according to the low power mode;
output, to the primary-side flyback drive circuitry, the one or more clock pulses configured to cause the primary-side flyback drive circuitry to output, according to the duty cycle, a second drive signal comprising a second amplitude greater than the first amplitude while operating according to the high power mode; and
skip output of the one or more clock pulses to the primary-side flyback drive circuitry for one or more clock cycles to cause the primary-side flyback drive circuitry to skip output for the one or more clock cycles while operating according to the cycle skip power mode.

7. The controller of claim 6, wherein the primary-side flyback drive circuitry comprises:
a pulse-width modulation circuit; and
a gate driver operably coupled to an output of the pulse-width modulation circuit.

8. The controller of claim 1,
wherein the electrical characteristic of a secondary-side output of the flyback power converter comprises a first electrical characteristic,
wherein the primary-side flyback drive circuitry is configured to drive the primary-side output of the flyback power converter to achieve a target value of the electrical characteristic of the secondary-side output of the flyback power converter, and
wherein the primary-side controller is further configured to:
enable the primary-side flyback drive circuitry so as to store electrical power in the primary-side output of the flyback power converter;
sense a second electrical characteristic of the primary-side of the flyback power converter;
in response to determining that a value of the second sensed electrical characteristic is greater than a predetermined threshold, disable, for a clock cycle, the primary-side flyback drive circuitry to transfer the electrical power to the secondary-side output of the flyback power converter.

9. The controller of claim 1, wherein the control message specifying the selected power mode comprises:
a header frame;
the selected power mode; and
a checksum.

10. The controller of claim 1,
wherein the primary-side controller comprises a clock frequency, and
wherein to transmit the control message specifying the selected power mode, the secondary-side controller is configured to transmit, less often than the clock frequency of the primary-side controller, a control message comprising 2 bits that specify the selected power mode.

11. The controller of claim 1,
wherein, at one of a power-on of the controller or a fault in the communication channel, the primary-side controller is configured to control the primary-side flyback drive circuitry to drive the primary-side output of the flyback power converter according to a safe power mode, wherein, during operation according to the safe power mode, the primary-side controller does not receive control messages from the secondary-side controller, and
wherein, after receiving the control message from the secondary-side controller, the primary-side controller is configured to switch from controlling the primary-side flyback drive circuitry to drive the primary-side output of the flyback power converter according to a safe power mode to controlling the primary-side flyback drive circuitry to drive the primary-side output of the flyback power converter according to the selected power mode of the plurality of power modes.

12. The controller of claim 1, wherein the electrical characteristic of the secondary-side output of the flyback power converter comprises one of a voltage or a current of the secondary-side output of the flyback power converter.

13. The controller of claim 1,
wherein a first semiconductor die comprises the primary-side circuit,
wherein a second semiconductor die comprises the secondary-side circuit,
wherein the communication channel comprises a high-voltage isolation channel between the first semiconductor die and the second semiconductor die, and
wherein a single package comprises the first semiconductor die, the second semiconductor die, and the high-voltage isolation channel.

14. A method comprising:
sensing, by a secondary-side controller of a secondary-side circuit of a controller for a flyback power converter, an electrical characteristic of a secondary-side output of the flyback power converter;
selecting, by the secondary-side controller and based on the sensed electrical characteristic, a power mode of a plurality of power modes;
transmitting, by the secondary-side controller and over a communication channel, a control message specifying the selected power mode;
receiving, by a primary-side controller of a primary-side circuit of the controller and over the communication channel, the control message specifying the selected power mode, wherein the primary-side circuit is isolated from the secondary-side circuit; and controlling, by the primary-side controller, primary-side flyback drive circuitry of the primary-side circuit to drive a primary-side output of the flyback power converter according to the selected power mode to control a value of the electrical characteristic of the secondary-side output of the flyback power converter.

15. The method of claim 14, wherein the plurality of power modes comprises at least a low power mode, a high power mode, and a cycle skip power mode.

16. The method of claim 15, wherein selecting the power mode of the plurality of power modes comprises:
in response to determining that a value of the sensed electrical characteristic is less than a first predetermined threshold, selecting the high power mode;
in response to determining that the value of the sensed electrical characteristic is transitioning from greater than a second predetermined threshold to less than or equal to the second predetermined threshold, selecting the low power mode; and
in response to determining that the value of the sensed electrical characteristic is greater than the second predetermined threshold, selecting the cycle skip power mode.

17. The method of claim 16,
wherein controlling the primary-side flyback drive circuitry to drive the primary-side output of the flyback power converter according to the selected power mode comprises:
outputting, to the primary-side flyback drive circuitry, one or more clock pulses configured to cause the primary-side flyback drive circuitry to output, according to a duty cycle, a first drive signal comprising a first amplitude while operating according to the low power mode;
outputting, to the primary-side flyback drive circuitry, the one or more clock pulses configured to cause the primary-side flyback drive circuitry to output, according to the duty cycle, a second drive signal comprising a second amplitude greater than the first amplitude while operating according to the high power mode; and
skipping output of the one or more clock pulses to the primary-side flyback drive circuitry for one or more clock cycles to cause the primary-side flyback drive circuitry to skip output for the one or more clock cycles while operating according to the cycle skip power mode.

18. The method of claim 16,
wherein the electrical characteristic of a secondary-side output of the flyback power converter comprises a first electrical characteristic, and
wherein the method further comprises:
driving, by the primary-side flyback drive circuitry, the primary-side output of the flyback power converter to achieve a target value of the electrical characteristic of the secondary-side output of the flyback power converter
enabling, by the primary-side controller, the primary-side flyback drive circuitry so as to store electrical power in the primary-side output of the flyback power converter;
sensing, by the primary-side controller, a second electrical characteristic of the primary-side of the flyback power converter;
in response to determining that a value of the second sensed electrical characteristic is greater than a predetermined threshold, disabling, by the primary-side controller and for a clock cycle, the primary-side flyback drive circuitry to transfer the electrical power to the secondary-side output of the flyback power converter.

19. The method of claim 16,
wherein the primary-side controller comprises a clock frequency, and
wherein transmitting the control message specifying the selected power mode comprises transmitting, less often than the clock frequency of the primary-side controller, a control message comprising 2 bits that specify the selected power mode.

20. A system comprising:
a gate driver configured to drive a primary-side output of a flyback power converter; and
a controller for the flyback power converter comprising:
a secondary-side circuit comprising:
a secondary-side controller configured to:
sense an electrical characteristic of a secondary-side output of the flyback power converter;
select, based on the sensed electrical characteristic, a power mode of a plurality of power modes; and
transmit, over a communication channel, a control message specifying the selected power mode; and
a primary-side circuit isolated from the secondary-side circuit, the primary-side circuit comprising:
a primary-side controller configured to:
receive, over the communication channel, the control message specifying the selected power mode; and
control the gate driver to drive a primary-side output of the flyback power converter according to the selected power mode to control a value of the electrical characteristic of the secondary-side output of the flyback power converter.

* * * * *